(12) United States Patent
Boni et al.

(10) Patent No.: US 12,242,051 B2
(45) Date of Patent: Mar. 4, 2025

(54) MICROELECTROMECHANICAL MIRROR DEVICE WITH PIEZOELECTRIC ACTUATION AND PIEZORESISTIVE SENSING HAVING SELF-CALIBRATION PROPERTIES

(71) Applicant: STMicroelectronics S.r.l., Agrate Brianza (IT)

(72) Inventors: Nicolo' Boni, Mountain View, CA (US); Gianluca Mendicino, Legnano (IT); Enri Duqi, Milan (IT); Roberto Carminati, Piancogno (IT); Massimiliano Merli, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 425 days.

(21) Appl. No.: 17/745,186

(22) Filed: May 16, 2022

(65) Prior Publication Data
US 2022/0373785 A1 Nov. 24, 2022

(30) Foreign Application Priority Data
May 20, 2021 (IT) .......................... 102021000013106

(51) Int. Cl.
G02B 26/08 (2006.01)
G01L 1/18 (2006.01)
H02K 11/21 (2016.01)

(52) U.S. Cl.
CPC .......... *G02B 26/0858* (2013.01); *G01L 1/183* (2013.01); *H02K 11/21* (2016.01)

(58) Field of Classification Search
CPC ...... G02B 26/0858; G01L 1/183; H02K 11/21
See application file for complete search history.

(56) References Cited

U.S. PATENT DOCUMENTS

2010/0058861 A1\* 3/2010 Kuang .................. G01C 19/56
  73/504.12
2015/0241196 A1 8/2015 Gerson
  (Continued)

FOREIGN PATENT DOCUMENTS

EP 3666727 A1 6/2020
WO 2021032484 A1 2/2021

OTHER PUBLICATIONS

IT Search Report and Written Opinion for priority application, IT 102021000013106, report dated Feb. 3, 2022, 11 pgs.

*Primary Examiner* — Kristina M Deherrera
*Assistant Examiner* — Jean F Morello
(74) *Attorney, Agent, or Firm* — Crowe & Dunlevy

(57) ABSTRACT

A microelectromechanical mirror device has, in a die of semiconductor material: a fixed structure defining a cavity; a tiltable structure carrying a reflecting region elastically suspended above the cavity; at least a first pair of driving arms coupled to the tiltable structure and carrying respective piezoelectric material regions which may be biased to cause a rotation thereof around at least one rotation axis; elastic suspension elements coupling the tiltable structure elastically to the fixed structure and which are stiff with respect to movements out of the horizontal plane and yielding with respect to torsion; and a piezoresistive sensor configured to provide a detection signal indicative of the rotation of the tiltable structure. At least one test structure is integrated in the die to provide a calibration signal indicative of a sensitivity variation of the piezoresistive sensor in order to calibrate the detection signal.

20 Claims, 6 Drawing Sheets

(56) References Cited

U.S. PATENT DOCUMENTS

| | | |
|---|---|---|
| 2017/0131162 A1 | 5/2017 | Jutzi et al. |
| 2019/0219468 A1* | 7/2019 | Duqi .................... G01L 27/002 |
| 2020/0192199 A1* | 6/2020 | Boni ................. G02B 26/0858 |
| 2020/0310110 A1 | 10/2020 | Carminati et al. |

* cited by examiner

MICROELECTROMECHANICAL MIRROR DEVICE WITH PIEZOELECTRIC ACTUATION AND PIEZORESISTIVE SENSING HAVING SELF-CALIBRATION PROPERTIES

PRIORITY CLAIM

This application claims the priority benefit of Italian Application for Patent No. 102021000013106, filed on May 20, 2021, the content of which is hereby incorporated by reference in its entirety to the maximum extent allowable by law.

TECHNICAL FIELD

This disclosure relates to a microelectromechanical mirror device made using Micro-Electro-Mechanical System (MEMS) technology, with piezoelectric actuation and piezoresistive sensing, having self-calibration properties.

BACKGROUND

Microelectromechanical mirror devices are used in portable apparatuses, such as for example smartphones, tablets, notebooks, and PDAs for optical applications, in particular to direct light radiation beams generated by a light source (for example a laser source) in desired manners. Thanks to their small size, these devices allow stringent restrictions as to space occupation, in terms of area and thickness, to be complied with.

For example, microelectromechanical mirror devices are used in optoelectronic apparatuses, such as miniaturized projectors (so-called picoprojectors), capable of projecting images from a distance and generating desired light patterns.

Microelectromechanical mirror devices generally include a tiltable structure carrying a suitable reflecting (or mirror) surface, elastically supported above a cavity and made from a body of semiconductor material so as to be movable, for example with tilt or rotation movement out of a relative main extension plane, to direct an impinging light beam in a desired manner.

The rotation of the mirror device is controlled through an actuation system which may be, for example, of electrostatic, electromagnetic or piezoelectric type.

Electrostatic actuation systems generally have the disadvantage of using high operating voltages, while electromagnetic actuation systems generally entail high power consumption; it has therefore been proposed to control the movement of the tiltable mirror structure with piezoelectric mode.

Mirror devices with piezoelectric actuation have the advantage of using reduced actuation voltages and power consumption with respect to devices with electrostatic or electromagnetic actuation.

Furthermore, it is possible to exploit the inverse piezoelectric effect to form piezoresistive (PZR) sensor elements for sensing the driving condition of the mirror (in terms of the stress applied or the displacement or position assumed) and providing a feedback signal to allow a feedback control of the driving operation.

However, these piezoresistive sensor elements use a dedicated calibration, in order to precisely know the corresponding detection sensitivity, and therefore the sensitivity of the mirror, and thus be able to have accurate information on the displacement of the same mirror to achieve the desired control.

Known solutions for the calibration of the aforementioned piezoresistive sensor elements have some limitations.

Known solutions provide for a complex calibration set-up comprising, for example: a driving unit to control the operation of the mirror; a laser source to direct a light beam onto the mirror; a projection screen whereon the mirror projects a light pattern due to the reflection of the laser beam and the driving movement of the same mirror; a camera to detect the angle of aperture, or opening angle (that is, the extent of the rotation out of the horizontal plane) of the mirror from the analysis of the projected light pattern; and an oscilloscope (or similar measuring instrument) for acquiring the detection signals provided by the piezoresistive sensor elements.

A processing unit is then configured to jointly process the information obtained from the analysis of the images acquired by the camera and the information obtained from the signals sensed by the piezoresistive elements, in order to obtain information for the calibration of the same piezoresistive elements (in particular to determine their detection sensitivity).

The calibration operations are therefore particularly onerous, in terms of time and economic resources utilized and are difficult to apply to large-scale manufacturing processes. As such, further development is needed.

There is a need in the art provide a microelectromechanical mirror device which allows the calibration challenges previously highlighted to be overcome, in particular being provided with self-calibration properties.

SUMMARY

Disclosed herein is a microelectromechanical mirror device, including, in a die of semiconductor material: a fixed structure defining a cavity; a tiltable structure carrying a reflecting region, elastically suspended above the cavity and having a main extension in a horizontal plane; at least one first pair of driving arms, coupled to the tiltable structure and carrying respective piezoelectric material regions, being biased to cause a rotation of the tiltable structure around a rotation axis that is parallel to a first horizontal axis of the horizontal plane; elastic suspension elements, configured to elastically couple the tiltable structure to the fixed structure at the rotation axis, being stiff with respect to movement out of the horizontal plane and yielding with respect to torsion around the rotation axis; a piezoresistive sensor, configured to provide a detection signal indicative of the rotation of the tiltable structure around the rotation axis; and at least one test structure, integrated in the die and configured to provide a calibration signal indicative of a sensitivity variation of the piezoresistive sensor for calibration of the detection signal. The sensitivity variation of the piezoresistive sensor is due to geometry variations in manufacturing of the microelectromechanical mirror device. The at least one test structure includes a movable mass operable in resonance by piezoelectric actuation, a resonance frequency associated with the at least one test structure having a variation which is a function of the geometry variations and correlated to the sensitivity variation of the piezoresistive sensor. The calibration signal is indicative of the variation of the resonance frequency.

The geometry variations may be due to Critical Dimension loss in the manufacturing of the microelectromechanical mirror device, at a front and/or at a back of the die of semiconductor material.

The movable mass may be arranged suspended inside the cavity formed in the die, and the at least one test structure may also include: a supporting beam, coupled at both ends to respective anchors, integral with the fixed structure; a torsional elastic element which couples the movable mass to the supporting beam, centrally with respect to the movable mass and to the supporting beam; and first and second piezoelectric actuators coupled to the supporting beam on opposite sides thereof with respect to the torsional elastic element.

The torsional elastic element may have characteristics matching the elastic suspension elements, in terms of length and width in the horizontal plane.

The microelectromechanical device may further include elastic decoupling elements which couple the tiltable structure to the at least one first pair of driving arms on opposite sides and in proximity to the rotation axis and are stiff toward movements out of the horizontal plane and yielding to torsion around an axis parallel to the rotation axis. An empty area, located in the horizontal plane between the supporting beam and the movable mass on sides of the torsional elastic element, may have dimensions corresponding to a respective empty area interposed in the horizontal plane between the elastic suspension elements and the elastic decoupling elements, laterally to the elastic suspension elements.

The variation of resonance frequency associated with the at least one test structure may be due to a dimensional variation of the elastic suspension elements, at the front of the die.

The movable mass of the at least one test structure may be a beam element, suspended above a respective cavity formed in the die, anchored to the fixed structure and carrying at its top a respective piezoelectric actuator. The beam element may have at its bottom, at the back of the die, a reinforcement portion, integral with the fixed structure and defining extension of a cantilever portion of the beam element.

The variation of the resonance frequency associated with the at least one test structure may be associated with a dimensional variation of the reinforcement portion at the back of the die.

The calibration signal may be a function of an impedance variation associated with the at least one test structure, the impedance variation having a determined and recognizable pattern at the resonance frequency.

The piezoresistive sensor may include four piezoresistor elements connected in a Wheatstone bridge configuration, according to an arrangement configured to reduce effects on detection sensitivity of the piezoresistive sensor caused by misalignments of the four piezoresistor elements with respect to the elastic suspension elements.

First and second of the four piezoresistor elements may be arranged in proximity to a first of the elastic suspension elements on a first side of the tiltable structure along the rotation axis, and third and fourth of the four piezoresistor elements may be arranged in proximity to a second of the elastic suspension elements on a second side of the tiltable structure along the rotation axis, opposite to the first side.

The first and second piezoresistor elements and third and fourth piezoresistor elements may be arranged at a separation distance along a second horizontal axis, orthogonal to the first horizontal axis and belonging to the horizontal plane, such that they are located at zones with reduced variation of a stress distribution due to the torsion of the elastic suspension elements.

The piezoresistive sensor may be arranged in proximity to, and associated with, one of the elastic suspension elements, to detect stress associated with its torsion and therefore with the movement of the tiltable structure.

The fixed structure may form, in the horizontal plane, a frame which delimits and surrounds the cavity, and also has a first and a second supporting element, extending longitudinally along the rotation axis inside the cavity from the frame, on opposite sides of the tiltable structure. The elastic suspension elements may extend between the tiltable structure and a respective one of the first and second supporting elements. The piezoresistive sensor may be formed at one of the first and second supporting elements.

The fixed structure may form, in the horizontal plane, a frame which delimits and surrounds the cavity, and may also have first and second supporting elements extending longitudinally along the rotation axis inside the cavity from the tiltable structure, on opposite sides of the tiltable structure. The elastic suspension elements may extend between the frame and a respective one of the first and second supporting elements. The piezoresistive sensor may be formed at the frame.

The microelectromechanical mirror device may be used within an optoelectronic system also including a control unit, configured to feedback control operation of the microelectromechanical mirror device based on the detection signal indicative of the rotation of the tiltable structure around the rotation axis provided by the piezoresistive sensor, calibrated as a function of the calibration signal indicative of the sensitivity variation of the piezoresistive sensor provided by the at least one test structure.

BRIEF DESCRIPTION OF THE DRAWINGS

For a better understanding, embodiments are now described, purely by way of non-limiting example, with reference to the attached drawings, wherein.

DETAILED DESCRIPTION

Figure 1A:
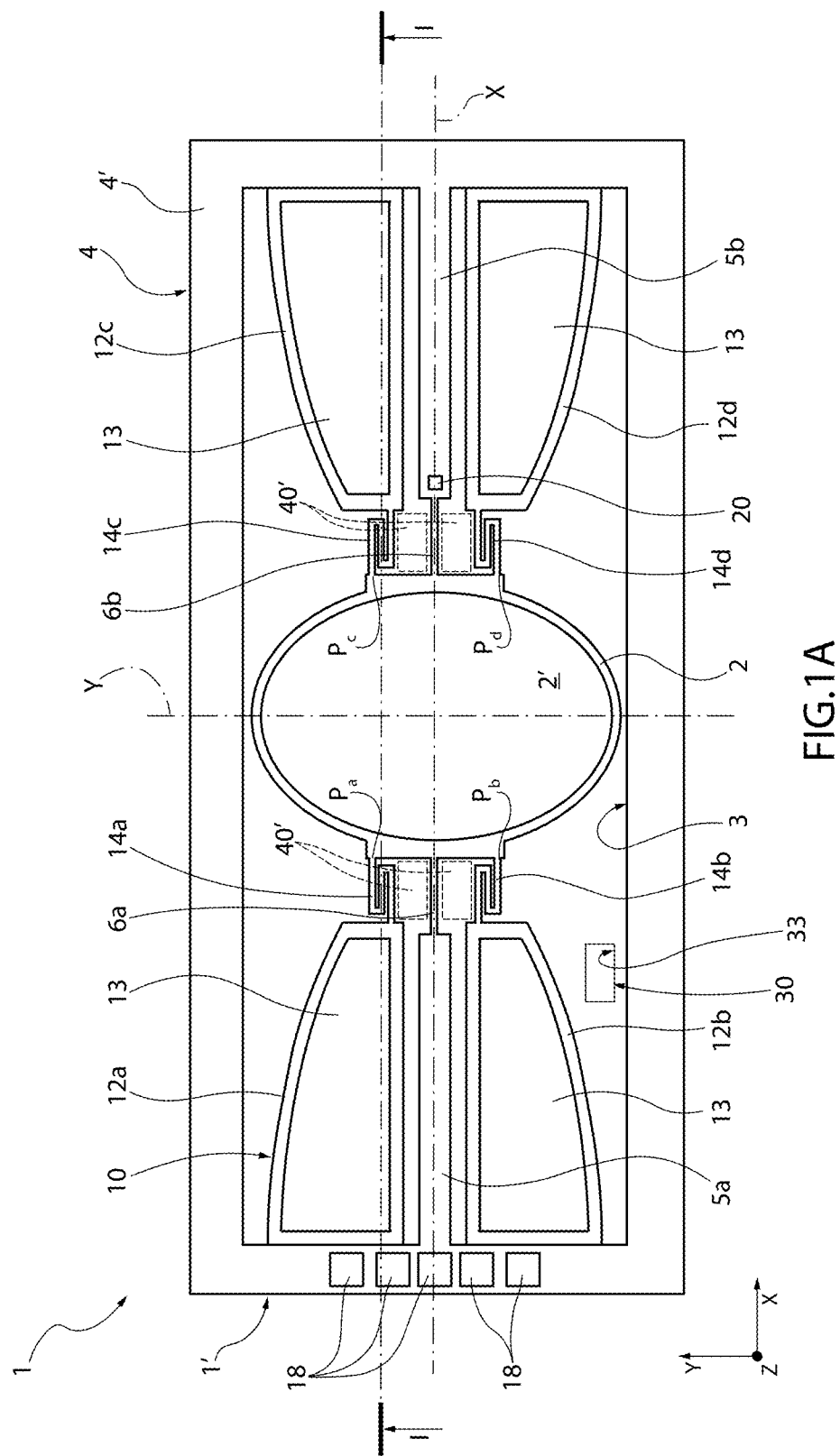
FIG. 1A shows a schematic plan view of a microelectromechanical mirror device, according to an aspect of this disclosure.

FIG. 1A schematically illustrates a microelectromechanical mirror device, based on MEMS technology, generally denoted with 1; this device generally has the structure disclosed in United States Published Patent Application No. 2020/0192199 (corresponding to European Patent Number EP 3666727A1), the contents of both of which are incorporated by reference in their entireties to the maximum extent allowable under the law.

The microelectromechanical device 1 is formed in a die 1' of semiconductor material, in particular silicon, and is provided with a tiltable structure 2 having a main extension in a horizontal plane xy and arranged to rotate around a rotation axis, parallel to a first horizontal axis x of the aforementioned horizontal plane xy.

The rotation axis represents a first median axis of symmetry X for the microelectromechanical device 1; a second median axis of symmetry Y for the same microelectromechanical device 1 is parallel to a second horizontal axis y, orthogonal to the first horizontal axis x and defining, with the same first horizontal axis x, the horizontal plane xy.

The tiltable structure 2 is suspended above a cavity 3, formed in the die 1' and defines a support structure, which carries a reflecting region 2' (for example of aluminum, or gold, depending on whether the projection is in the visible or in the infrared) at the top, to define a mirror structure.

The tiltable structure 2 is elastically coupled to a fixed structure 4, defined in the same die 1'. In particular, the fixed structure 4 forms, in the horizontal plane xy, a frame 4', which delimits and surrounds the aforementioned cavity 3, and also has a first and a second supporting (or anchoring) element 5a, 5b, extending longitudinally along the first median axis of symmetry X inside the cavity 3 from the same frame 4', on opposite sides of the tiltable structure 2 (along the first horizontal axis x).

The tiltable structure 2 is supported by the first and second supporting elements 5a, 5b, to which it is elastically coupled through first and second elastic suspension elements 6a, 6b, having high stiffness with respect to movements out of the horizontal plane xy (along an orthogonal axis z, transverse to this horizontal plane xy) and yielding with respect to torsion around the first horizontal axis x. The first and second elastic suspension elements 6a, 6b extend overall along the first median axis of symmetry X, between the first and second supporting elements 5a, 5b and a facing side of the tiltable structure 2, being coupled at a central portion thereof. In the illustrated embodiment, the first and second elastic suspension elements 6a, 6b are of a linear type.

The first and second elastic suspension elements 6a, 6b couple the tiltable structure 2 to the fixed structure 4, allowing it to rotate around the first rotation axis and providing high stiffness with respect to movements out of the plane, thus ensuring a high ratio between the frequencies of spurious movements out of the horizontal plane xy and the rotation frequency around the first rotation axis.

The microelectromechanical device 1 further comprises an actuation structure 10, coupled to the tiltable structure 2 and configured to cause the rotation thereof around the first rotation axis; the actuation structure 10 being interposed between the tiltable structure 2 and the fixed structure 4 and also contributing to supporting the tiltable structure 2 above the cavity 3.

This actuation structure 10 comprises a first pair of driving arms formed by first and second driving arms 12a, 12b, arranged on opposite sides of, and symmetrically with respect to, the first median axis of symmetry X and the first supporting element 5a, and having a longitudinal extension parallel to the first horizontal axis x and to the aforementioned first supporting element 5a.

In the embodiment illustrated in FIG. 1, the driving arms 12a, 12b have a generically trapezoidal (or "fin-like") shape, with major side directed parallel to the second horizontal axis y and integrally coupled to the frame 4' of the fixed structure 4; and minor side directed parallel to the same second horizontal axis y and elastically coupled to the tiltable structure 2. Each driving arm 12a, 12b therefore has a respective first end integrally coupled to the frame 4' of the fixed structure 4 and a respective second end elastically coupled to the tiltable structure 2, through first and second elastic decoupling elements 14a, 14b.

Each driving arm 12a, 12b is suspended above the cavity 3 and carries, at a top surface thereof (opposite to the same cavity 3), a respective piezoelectric structure 13 (in particular including Lead Zirconate Titanate—PZT), having for example substantially the same extension in the horizontal plane xy with respect to the driving arm 12a, 12b.

This piezoelectric structure 13 (in a manner not illustrated in detail) is formed by superimposing: a bottom electrode region, of a suitable conductive material, arranged above the relative driving arm 12a, 12b; a piezoelectric material region (for example made by a thin PZT film) arranged on the aforementioned bottom electrode region; and a top electrode region arranged on the piezoelectric material region.

The aforementioned first and second elastic decoupling elements 14a, 14b have high stiffness with respect to movements out of the horizontal plane xy (along the orthogonal axis z) and are yielding to torsion (around a rotation axis parallel to the first horizontal axis x). The first and second elastic decoupling elements 14a, 14b extend parallel to the first horizontal axis x, between the first and second driving arms 12a, 12b and a same facing side of the tiltable structure 2.

The first and second elastic decoupling elements 14a, 14b are coupled to the tiltable structure 2 at a respective coupling point Pa, Pb, which is located in proximity to the first median axis of symmetry X, at a short distance from the same first median axis of symmetry X. For example, this distance may be comprised between 10 μm and 1500 μm in a typical embodiment and may also be generally comprised between ⅒ and ½ of a main dimension (in the example along the second median axis of symmetry Y) of the tiltable structure 2.

In any case, the distance between the respective coupling point Pa, Pb and the first median axis of symmetry X is preferably smaller, in particular much smaller, than the distance between the same coupling point Pa, Pb and end or edge portions (considered along the second median axis of symmetry Y) of the tiltable structure 2. In fact, the closer these coupling points Pa, Pb are to the first rotation axis, the greater the ratio between the vertical displacement of the end of the tiltable structure 2 and the vertical displacement of the driving arms 12a, 12b, due to the piezoelectric effect.

In the embodiment illustrated in FIG. 1A, the first and second elastic decoupling elements 14a, 14b are of a folded type, being formed by a plurality of arms having a longitudinal extension parallel to the first horizontal axis x, connected two by two through connecting elements having extension parallel to the second horizontal axis y (in a different embodiment. The elastic decoupling elements 14a, 14b may alternatively be of a linear type).

The aforementioned actuation structure 10 further comprises a second pair of driving arms formed by a third and a fourth driving arm 12c, 12d, arranged on opposite side of the first median axis of symmetry X and, this time, of the second supporting element 5b and having a longitudinal extension parallel to the first horizontal axis x and to the aforementioned second supporting element 5b (the second pair of driving arms 12c, 12d is therefore arranged symmetrically to the first pair of driving arms 12a, 12b with respect to the second median axis of symmetry Y).

Similarly to what has been discussed for the first pair of driving arms 12a, 12b, each driving arm 12c, 12d of the second pair carries, at a top surface thereof, a respective piezoelectric structure 13 (in particular including PZT—Lead Zirconate Titanate) and has a respective first end integrally coupled to the frame 4' of the fixed structure 4 and a respective second end elastically coupled to the tiltable structure 2, through a respective third and fourth elastic decoupling element 14c, 14d (arranged on opposite side of the first and second elastic decoupling elements 12a, 12b with respect to the second median axis of symmetry Y).

The aforementioned third and fourth elastic decoupling elements 14c, 14d also have high stiffness with respect to movements out of the horizontal plane xy (along the orthogonal axis z) and are yielding to torsion (around a rotation axis parallel to the first horizontal axis x).

As illustrated in the aforementioned FIG. 1A, the third and the fourth elastic decoupling elements 14c, 14d are also coupled to the tiltable structure 2 at a respective coupling point Pc, Pd, which is located in proximity to the first rotation axis, at the short distance d from the same first rotation axis. Furthermore, the third and the fourth elastic decoupling elements 14c, 14d are also of a folded type.

The microelectromechanical device 1 further comprises a plurality of electrical contact pads 18, carried by the fixed structure 4 at the frame 4', electrically connected (in a manner not illustrated in detail in the same FIG. 1) to the piezoelectric structures 13 of the driving arms 12a-12d through electrical connection tracks, to allow electrical biasing thereof through electrical signals coming from the outside of the same electromechanical device 1 (for example provided by a biasing device of an electronic apparatus having the electromechanical device 1 integrated therein).

During operation of the microelectromechanical device 1, the application of a biasing voltage to the piezoelectric structure 13 of the first driving arm 12a (having a positive value with respect to the biasing of the piezoelectric structure 13 of the second driving arm 12b, which may for example be connected to a ground reference potential), causes a rotation of a positive angle around the first rotation axis (parallel to the first horizontal axis x).

In a corresponding manner, the application of a biasing voltage to the piezoelectric structure 13 of the second driving arm 12b (having a positive value with respect to the biasing of the piezoelectric structure 13 of the first driving arm 12a, which may for example in this case be connected to a ground reference potential), causes a corresponding rotation of a negative angle around the same first rotation axis.

It should be noted that the same biasing voltage may be applied to the piezoelectric structure 13 of both the first driving arm 12a and the third driving arm 12c, and, likewise, in order to cause rotation in the opposite direction, to the piezoelectric structure 13 of both the second driving arm 12b and the fourth driving arm 12d, to contribute in a corresponding manner to the rotation of the tiltable structure 2 around the first rotation axis (as on the other hand will be apparent from the foregoing description).

The elastic decoupling elements 14a-14d elastically decouple the displacement of the driving arms 12a-12d along the orthogonal axis z due to the piezoelectric effect, from the consequent rotation of the tiltable structure 2 along the first rotation axis.

In particular, by virtue of the proximity to the rotation axis of the coupling points Pa-Pd between the same elastic decoupling elements 14a-14d and the tiltable structure 2, a wide angle of aperture (i.e. angle of rotation of the tiltable structure 2 around the first rotation axis), or, likewise, a large displacement out of the horizontal plane xy of the end portions (considered along the second horizontal axis y) of the same tiltable structure 2 corresponds to a small displacement out of the horizontal plane xy of the aforementioned driving arms 12a-12d; for example, the ratio between the extent of these displacements may be equal to five in a possible embodiment.

The tiltable structure 2 may thereby reach wide angles of aperture (for example >10°) with a low value of the biasing voltage (for example <40 V).

The maximum amount of stress occurs in the elastic suspension elements 6a, 6b that couple the tiltable structure 22 to the fixed structure 4.

Figure 1B:
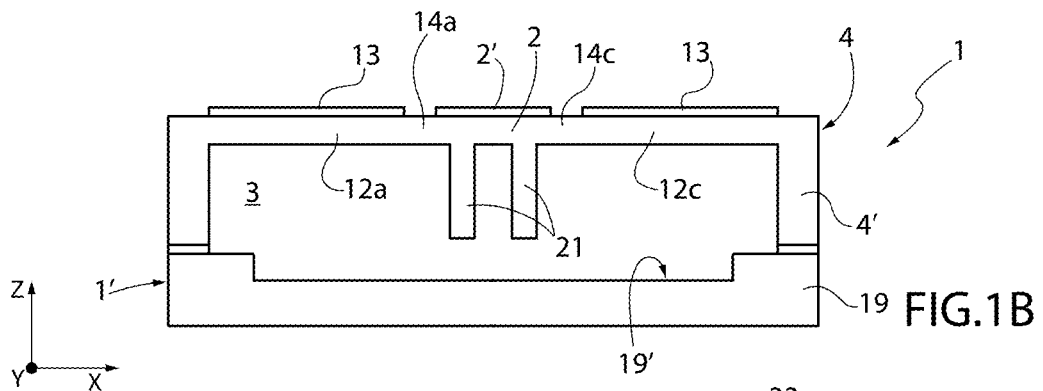
FIG. 1B is a simplified schematic cross-section view taken along section line I-I of the mirror device of FIG. 1A.

FIG. 1B shows a schematic cross-section of the microelectromechanical device 1. In particular, this section (parallel to the first horizontal axis x) shows that the thickness (along the orthogonal axis z) of the elastic decoupling elements 14a-14d (and, in a manner not illustrated, also of the elastic suspension elements 6a, 6b) is equal to the thickness of the driving arms 12a-12d and also corresponds to the thickness of the tiltable structure 2, for example being equal to 20 μm, this thickness being hereinafter referred to as the first thickness (the aforementioned elements are essentially formed at the front of the die 1').

A reinforcement structure 21 is coupled underneath the same tiltable structure 2, having the function of mechanical reinforcement for the same tiltable structure 2 (and also for ensuring a flatness thereof, in the horizontal plane xy, in a rest condition). This reinforcement structure 21 has a second thickness along the orthogonal axis z, which is greater than the first thickness, for example being equal to 140 μm, and may have a ring shape and be arranged at the periphery of the tiltable structure 2 (the same reinforcement structure 21 is substantially formed on the back of the die 1').

The fixed structure 4 of the microelectromechanical device 1 (in particular, the corresponding frame 4') has a thickness, along the orthogonal axis z, substantially equal to the sum of the aforementioned first and second thicknesses.

As shown in the same FIG. 1B, a base body 19 is also coupled underneath the fixed structure 4 and has, underneath the cavity 3 and corresponding to the movable structure 2, a recess 19', to allow the rotation of the same movable structure 2. In particular, the frame 4' is coupled to this supporting body 19 through suitable bonding material regions.

As illustrated again in FIG. 1A, the microelectromechanical device 1 further comprises a piezoresistive (PZR) sensor 20, suitably arranged to provide a detection signal associated with the rotation of the tiltable structure 2 around the first rotation axis; this detection signal may be provided as a feedback to the outside of the microelectromechanical device 1, through at least one of the electrical contact pads 18.

In the embodiment illustrated in FIG. 1A, this piezoresistive sensor 20 is provided (for example by surface diffusion of dopant atoms) at the second supporting element 5b (different arrangements may, however, be provided for the same piezoresistive sensor 20, which may for example be similarly provided at the first supporting element 5a).

In general, the piezoresistive sensor 20 may be arranged in proximity to the elastic suspension elements 6a, 6b, to detect the stress associated with their torsion and therefore provide an indication relating to the displacement of the tiltable structure 2.

Advantageously, the elastic suspension elements 6a, 6b are capable of transmitting the stress to the supporting elements 5a, 5b and hence towards the piezoresistive sensor 20, enabling arrangement of the latter at the same supporting elements 5a, 5b and a consequent simplification of routing of the electrical connections to the electrical contact pads 18.

As will also be discussed below, the aforementioned piezoresistive sensor 20 may for example be made by four piezoresistor elements which are arranged and connected in a Wheatstone bridge configuration, at the end of the corresponding supporting element (in the example of the second supporting element 5b) that is coupled to the corresponding elastic suspension element (in the example to the second elastic suspension element 6b). Electrical connection tracks (not illustrated in detail) extend from the aforementioned piezoresistor elements along the corresponding supporting element, to reach (in a manner not illustrated here) the electrical contact pads 18.

The sensitivity of the piezoresistive sensor 20 has a variability factor dependent on the stress felt, which is a function of possible geometry variations in the manufacturing of the structure, in particular in the manufacturing of the elastic elements for transmitting the stress to the same piezoresistive sensor 20 (i.e., in the illustrated embodiment, the elastic suspension elements 6a, 6b).

Variations in the dimension, in particular in the transverse width, of the elastic suspension elements 6a, 6b may occur, due to the so-called "Critical Dimension—CD—loss" error; as a result of this error, for example, the dimensions of the elements formed by etching do not correspond to the dimensions of the photolithographic etching masks used for their manufacturing.

Such geometric variations entail a variation of the operating (torsional) frequency of the tiltable structure 2 of the microelectromechanical device 1; however, this variation is due to the geometric variations not only of the elastic suspension elements 6a, 6b, but also, for example, of the reflecting region 2' carried by the tiltable structure 2 and of the reinforcement structure 21 coupled underneath the tiltable structure 2.

As a result, it is not possible to obtain information about the sensitivity variation of the piezoresistive sensor 20 from the variation of the torsional frequency of the tiltable structure 2.

One aspect provides for integrating, in the die 1' of the microelectromechanical device 1, at least one test structure 30 (schematically indicated in FIG. 1A) configured to provide information about the sensitivity variation of the piezoresistive sensor 20, in particular comprising (as will be discussed in detail below) at least one movable or tiltable mass, operable at a resonance frequency. In particular, this test structure 30 is configured so that a variation of this resonance frequency is associated with the geometric variations in a substantially exclusive manner, due to the "CD loss" error, so as to be correlated to the sensitivity variation of the piezoresistive sensor 20. In other words, from the variation of resonance frequency of the test structure 30, the sensitivity variation of the piezoresistive sensor 20 may be determined.

The information obtained from the test structure 30 may therefore be used in a suitable manner for the calibration of the sensitivity of the piezoresistive sensor 20.

In a possible embodiment, the test structure 30 comprises a torsional elastic element which elastically supports the movable mass; the characteristics of the aforementioned torsional elastic element are such that they substantially match the characteristics of the elastic suspension elements 6a, 6b of the tiltable structure 2 (in terms of dimensions, i.e. length and width, of the configuration and arrangement), such that the variation of resonance frequency of this torsional elastic element provides a reliable indication on the dimensional variations of the same elastic suspension elements 6a, 6b (due to CD loss) and, consequently, an indication of the correlated sensitivity variation of the piezoresistive sensor 20.

Figure 2A:
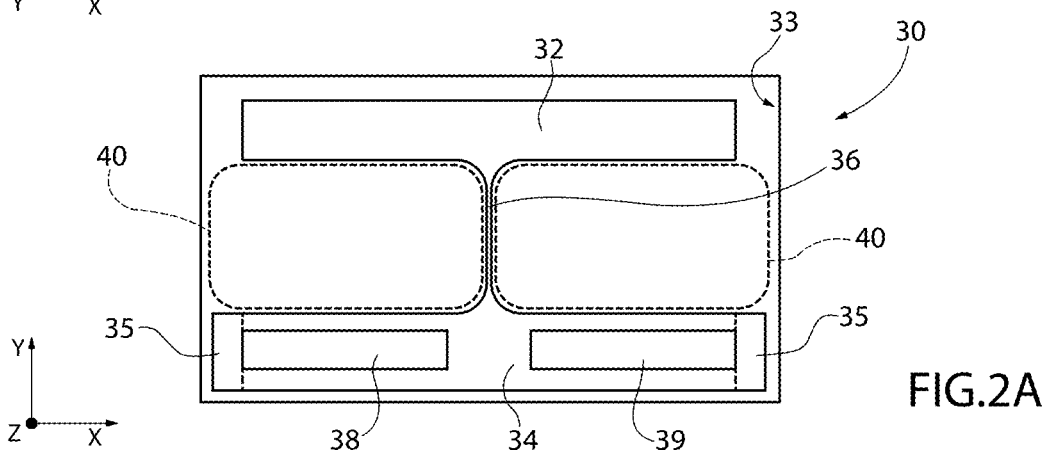
FIG. 2A shows an enlarged portion of the device of FIG. 1A, in plan view, including a test structure according to a first embodiment described herein.
Figure 2B:
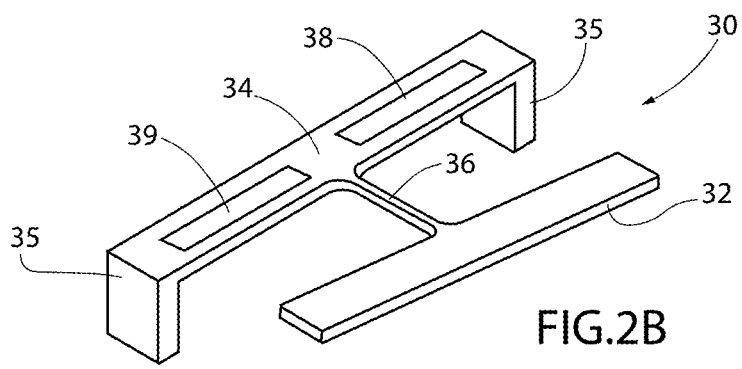
FIG. 2B shows a simplified perspective view of part of the test structure of FIG. 2A.

In detail, in a possible embodiment, illustrated in FIGS. 2A and 2B, the test structure 30 comprises:

a movable (in particular tiltable) mass 32, arranged suspended above a respective cavity 33 provided through the frame 4' (as shown schematically in the aforementioned FIG. 1A) and having for example a rectangular shape in the horizontal plane xy, with a thickness corresponding to the aforementioned first thickness;

a supporting beam 34, coupled at both ends to respective anchors 35, integral with the fixed structure 4 defined in the die 1' (such anchors 35 may, for example, be defined by portions of the frame 4' facing the cavity 33, or by pillars coupled at the bottom, in a manner not illustrated, to the base body 19); and a torsional elastic element 36, which couples the tiltable mass 32 to the supporting beam 34, centrally with respect to the same movable mass 32 and to the same supporting beam 34.

This torsional elastic element 36, as previously indicated, has characteristics matching those of the first and second elastic suspension elements 6a, 6b, having a high stiffness with respect to movements out of the horizontal plane xy and being yielding with respect to torsion around its own longitudinal axis (in the example along the second horizontal axis y), thus allowing the rotation of the movable mass 32.

The torsional elastic element 36 thus extends, in the example with linear extension, along the second horizontal axis y, between a central portion of the supporting beam 34 and a facing central portion of the movable mass 32.

The test structure 30 also comprises first and second piezoelectric actuators 38, 39 (in particular including PZT—Lead Zirconate Titanate), coupled on top of the supporting beam 34, on opposite sides with respect to the central part coupled to the torsional elastic element 36.

In a manner not illustrated in detail, these piezoelectric actuators 38, 39 are formed by superposing: a bottom electrode region, of a suitable conductive material, arranged above the corresponding portion of the supporting beam 34; a piezoelectric material region (for example made by a thin PZT film) arranged on the aforementioned bottom electrode region; and a top electrode region arranged on the piezoelectric material region.

As schematically indicated in FIG. 2A by the dashed boxes, an empty area 40, comprised in the horizontal plane xy between the supporting beam 34 and the movable mass 32, at the sides of the torsional elastic element 36, may have a dimension substantially equivalent to the corresponding empty area 40' (see FIG. 1A and the corresponding dashed boxes) interposed between each elastic suspension element 6a, 6b and the associated elastic decoupling elements 14a, 14b (respectively 14c, 14d), laterally to the same elastic suspension elements 6a, 6b.

This matching of empty areas 40, 40' contributes to increasing the similarity of behavior between the test structure 30 and the mirror structure, thereby further improving the resulting accuracy of the calibration of sensitivity of the piezoresistive sensor 20.

Figure 3:
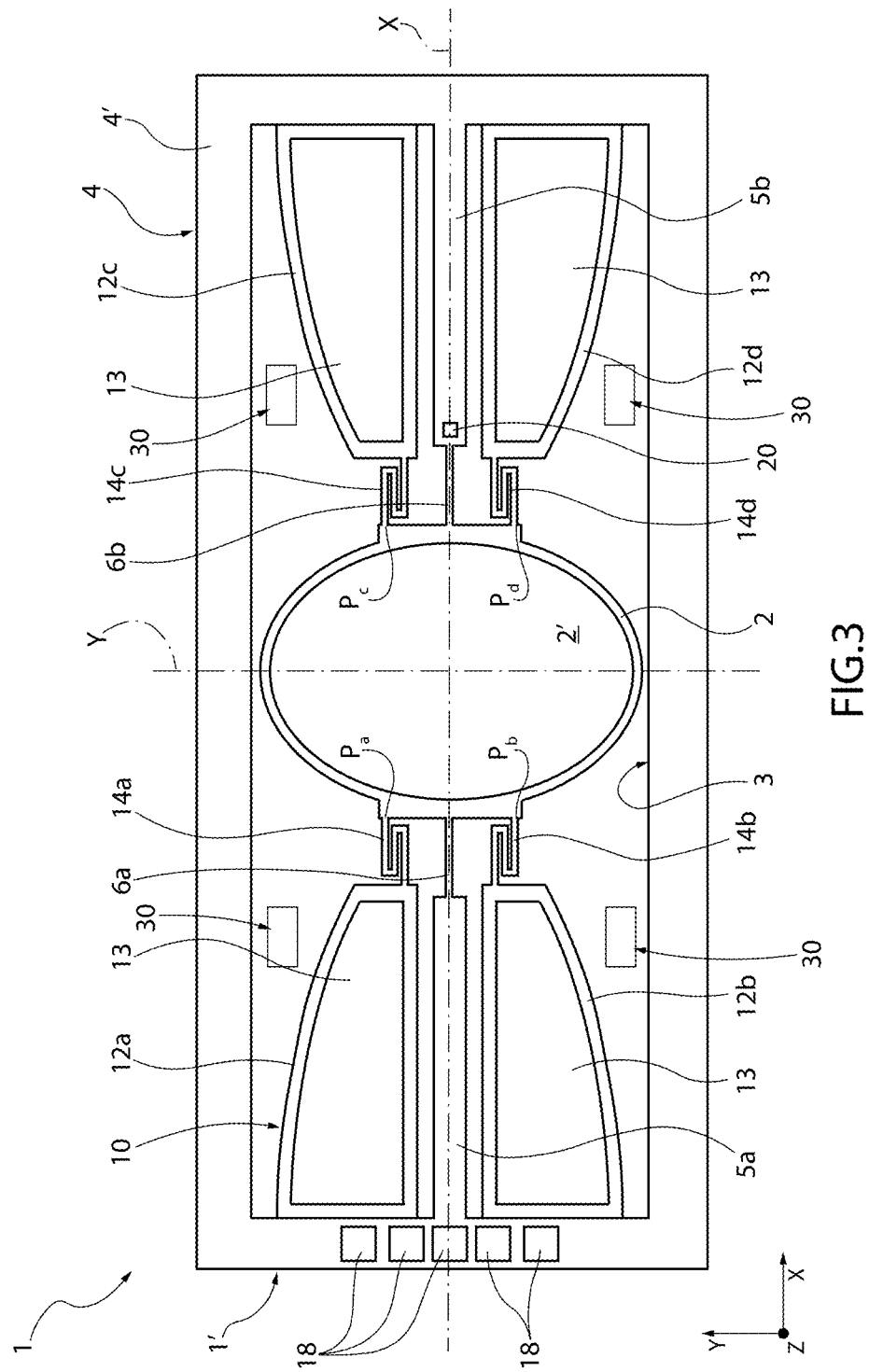
FIG. 3 shows a schematic plan view of the microelectromechanical mirror device, according to a variation of this disclosure.

As shown in FIG. 3, in a possible embodiment, the microelectromechanical device 1 may comprise a plurality of test structures 30 (each made as previously discussed in detail), in the example four in number, arranged in respective cavities 33 formed in the frame 4', at the side, at the bottom and at the top, with respect to the tiltable structure 2.

In general, the presence of a plurality of test structures 30 allows increasing of the reliability of the calibration of sensitivity of the piezoresistive sensor 20, for example implementing an averaging of the calibration indications provided by each of the same test structures 30.

In a possible embodiment, the resonance frequency associated with the test structure 30 (from which the information for sensitivity calibration of the piezoresistive sensor 20 are obtained) may be determined by an impedance spectroscopy technique.

Figure 4:
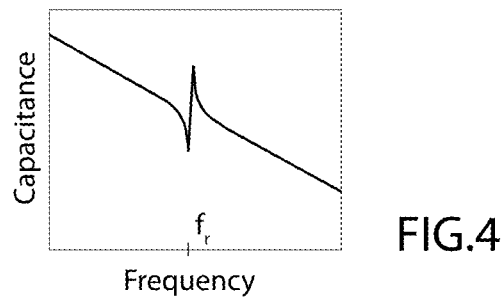
FIG. 4 shows a plot of calibration quantities associated with the test structure.

In particular, and with reference to FIG. 4, a suitable actuation voltage (for example with a value of 15 V) is applied to the first and/or the second piezoelectric actuators 38, 39 at a variable frequency in a certain range (around a design value, for example equal to 6 kHz) and the impedance associated with the same piezoelectric actuators 38, 39 (for example, the capacitance between the corresponding top and bottom electrode regions) is measured.

As shown in the aforementioned FIG. 4, a characteristic pattern (with two consecutive peaks, negative and positive) occurs in the trend of the capacitance value, at the resonance frequency of the test structure 30, indicated with $f_r$; this pattern may be easily detected to obtain the value of the same resonance frequency $f_r$.

The variation between this resonance frequency $f_r$ and the design frequency is, as previously discussed, attributable to the geometric variations that occur in the formation of the test structure 30, and therefore provides the desired indication relating to the CD loss and, consequently, to the sensitivity variation of the piezoresistive sensor 20 (the same piezoresistive sensor 20 being substantially affected by the same geometric variations).

It is highlighted that this measurement technique is simple and inexpensive to implement, providing for a reduced number of further electrical contact pads 18, carried by the fixed structure 4 at the frame 4', electrically connected (in a manner not illustrated in detail) to the piezoelectric actuators 38, 39 and in particular to the corresponding top and/or bottom electrode regions.

As previously indicated, the piezoresistive sensor 20 may be made of four piezoresistor elements arranged and connected in a Wheatstone bridge configuration.

A further aspect of this disclosure provides for a suitable arrangement of the aforementioned piezoresistor elements, aimed at minimizing or reducing the effects that possible misalignments of the same piezoresistor elements with respect to the longitudinal axis of the elastic suspension elements 6a, 6b may have on the detection sensitivity of the same piezoresistive sensor 20. In this regard, in known solutions, a possible sensitivity variation >1%/μm, with misalignment values that may even reach 2 or 3 μm.

Figure 5:
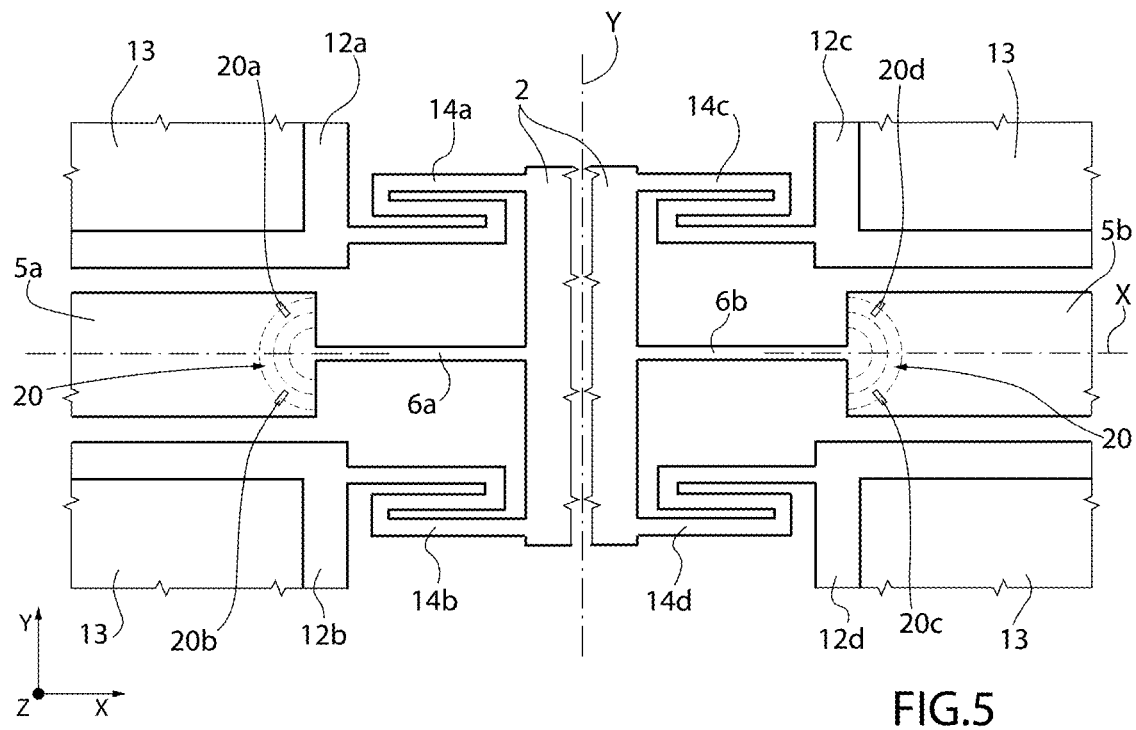
FIG. 5 shows an enlarged portion of the device of FIG. 1A, relating to a piezoresistive sensor, according to a further aspect of this disclosure.

As illustrated in FIG. 5, one aspect of this disclosure therefore provides for "splitting" the Wheatstone bridge, with a first half of the piezoresistor elements (first and second piezoresistor elements 20a, 20b) arranged at the end of the first supporting element 5a coupled to the first elastic suspension element 6a; and a second half of the piezoresistor elements (third and fourth piezoresistor elements 20c, 20d) arranged at the end of the second supporting element 5b coupled to the second elastic suspension element 6b.

This arrangement of the piezoresistor elements 20a-20d substantially eliminates (or in any case substantially reduces) the sensitivity variation due to possible misalignments along the first horizontal axis x, given that a moving away/approaching of the piezoresistor elements 20c, 20d of the second pair from/to the corresponding second elastic suspension element 6b corresponds to an identical approaching/moving away of the piezoresistor elements 20a, 20b of the first pair to/from the corresponding first elastic suspension element 6a.

A further aspect of this disclosure provides for separating the piezoresistor elements (20a-20b and 20c-20d) of each pair along the direction of the second horizontal axis y, such that the same piezoresistor elements are arranged at zones with reduced variation of stress distribution.

As shown schematically in the same FIG. 5, the stress distribution lines have, at the supporting elements 5a, 5b, due to the torsion of the elastic suspension elements 6a, 6b, a semicircle configuration, with an increasing radius as the distance from the same elastic suspension elements 6a, 6b increases. In particular, it is apparent that a slope of the stress distribution lines (with respect to the first horizontal axis x) is maximum at the first horizontal axis x and decreases as it moves away from the same first horizontal axis x along the second horizontal axis y.

The piezoresistor elements of each pair (20a-20b and 20c-20d) are thus placed at a suitable separation distance along the second horizontal axis y, each being arranged at an edge portion of the corresponding supporting element 5a, 5b.

In the illustrated example, the piezoresistor elements 20a-20d are also placed so that they have a substantially orthogonal arrangement with respect to the aforementioned stress distribution lines.

The possibility of obtaining a value of sensitivity variation of the piezoresistive sensor 20 lower than 0.15%/μm with respect to misalignments along the second horizontal axis y, for example due to misalignments of the photolithographic etching masks, has therefore been demonstrated.

With the aforementioned disclosures and the suitable self-calibration of the sensitivity of the piezoresistive sensor 20, it has been found that errors in detecting the position of the tiltable structure 2 due to the sensitivity variation of the same piezoresistive sensor 20 may be less than 100 mdeg with respect to angles of aperture of the mirror which are greater than 10 deg.

A further aspect of this disclosure is that the test structure may provide, in alternative or in addition to the indication relating to the geometry variations on the front of the die 1' (as previously discussed), an indication relating to the geometry variations that may occur on the back of the same die 1'.

In particular, for example again due to the CD loss error, dimensional variations of the structures formed on the back of the die 1' may occur, which may cause, in certain embodiments, a variation in detection sensitivity of the piezoresistive sensor 20.

Figure 6A:
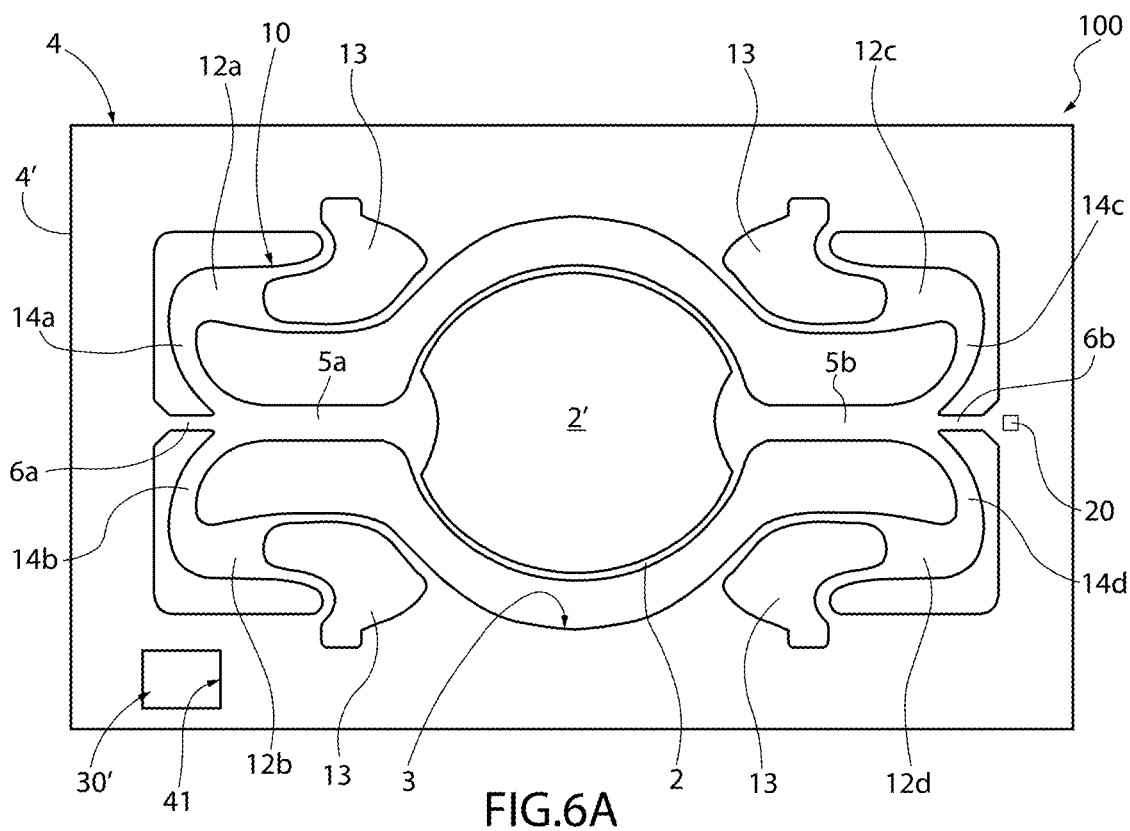
FIG. 6A shows a schematic plan view of a microelectromechanical mirror device, according to a further aspect of this disclosure.
Figure 6B:
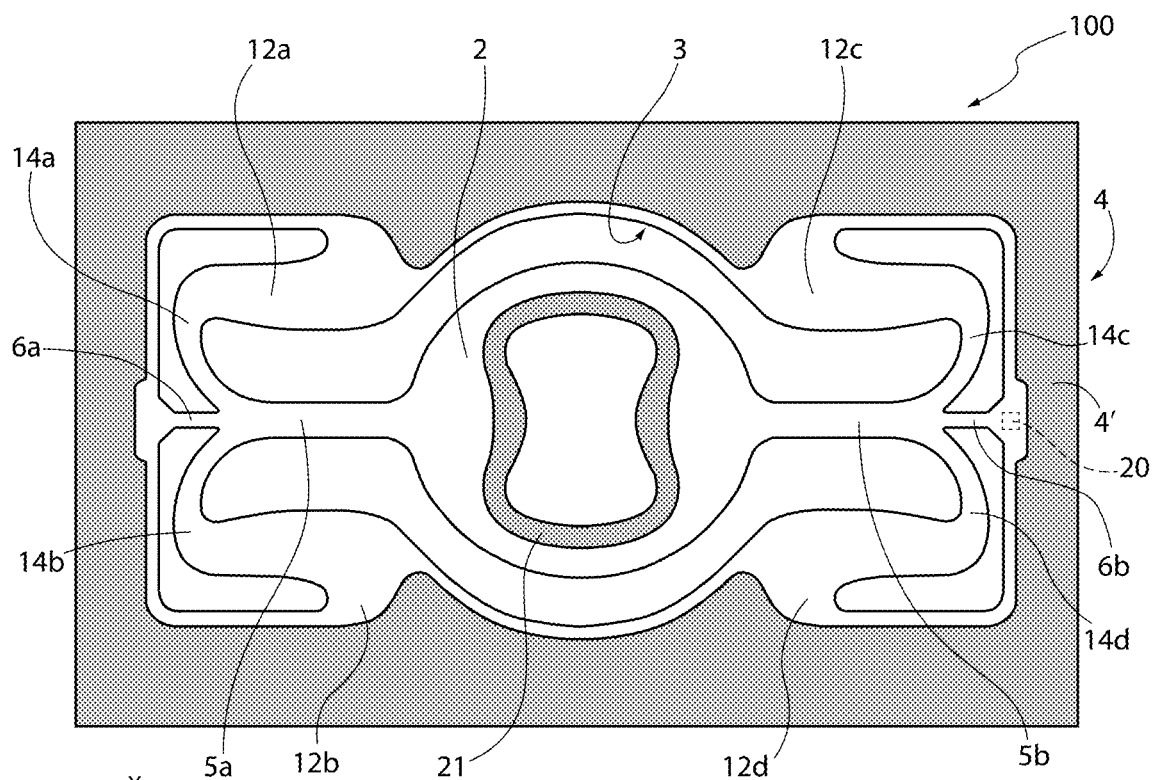
FIG. 6B is a schematic rear view of the mirror device of FIG. 6A.

In this regard, FIGS. 6A and 6B show a possible further embodiment of the microelectromechanical mirror device, here indicated with 100, in this case of a resonant type for high frequency applications.

This microelectromechanical device is described in detail for example in United States Published Patent Application No. 2020/0310110, the contents of which are incorporated by reference in their entirety.

In general, the configuration of the microelectromechanical device 100 is similar to what has been previously discussed for the microelectromechanical device 1, the device indeed comprising:

the tiltable structure 2 suspended above the cavity 3 inside the frame 4' defined by the fixed structure 4 of the die 1' and carrying the mirror reflecting region 2'; and the actuation structure 10, coupled to the tiltable structure 2 and configured to cause the rotation thereof, interposed between the tiltable structure 2 and the fixed structure 4 and comprising the first pair of driving arms 12a, 12b and the second pair of driving arms 12c, 12d (each carrying a respective piezoelectric structure 13).

The elastic suspension elements 6a, 6b are in this case interposed between the frame 4' of the fixed structure 4 and the supporting elements 5a, 5b, the latter being coupled to the tiltable structure 2 and having themselves torsional elastic characteristics.

In this case, the piezoresistive sensor 20 is placed at the portion of the frame 4' coupled to the second elastic suspension element 6b, so as to provide, again, a detection signal associated with the rotation of the tiltable structure 2 around the rotation axis (usable for feedback control of the mirror).

As also highlighted by FIG. 6B, in this case the sensitivity of the piezoresistive sensor 20, due to its placing in proximity to the frame 4', is also affected by the effects of CD loss that may occur on the back of the die 1' (the frame 4' is in fact also defined on the back of the same die 1').

A further aspect of this disclosure therefore provides for introducing, in addition to the test structure(s) 30, at least one further test structure, indicated schematically with 30', suitably configured to provide, again on the basis of the variation of a relative resonance frequency, indications about the geometric variations on the back of the die 1' due to the CD loss (and therefore to the associated sensitivity variations of the piezoresistive sensor 20).

Figure 7A:
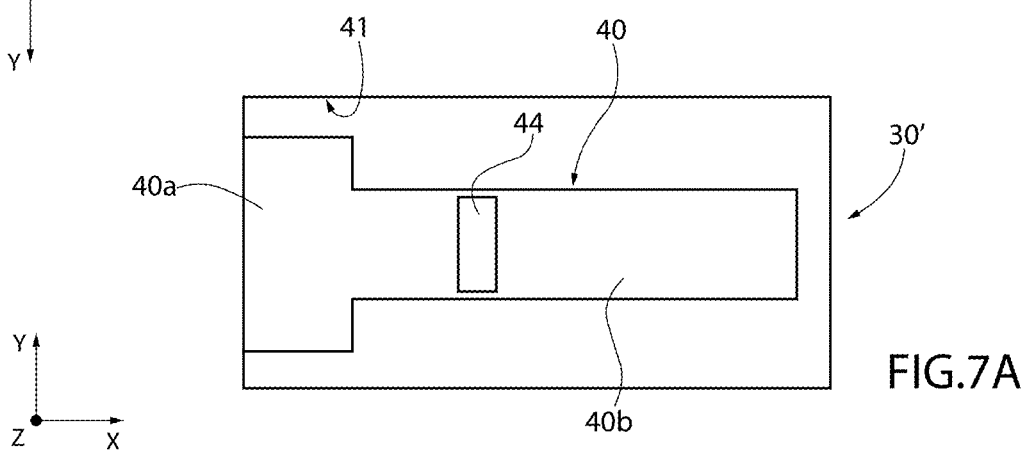
FIGS. 7A, 7B show, in plan view from the front and respectively from the back, an enlarged portion of the device of FIG. 6A, including a test structure according to a second embodiment described herein.
Figure 7B:
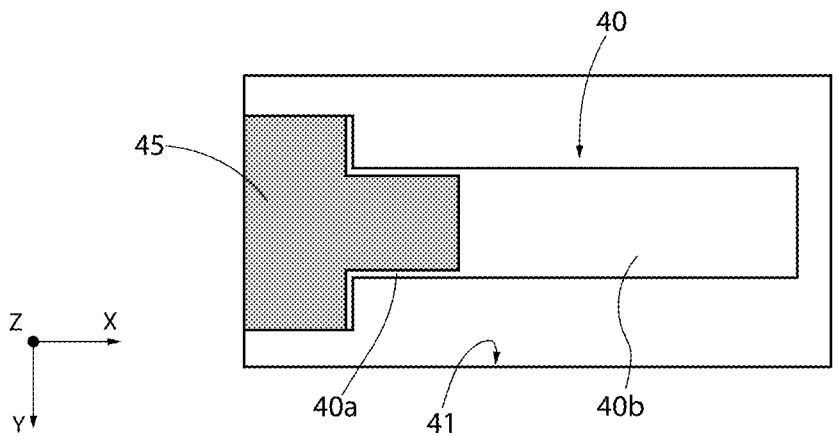

In a possible embodiment, shown in FIGS. 7A and 7B, this further test structure 30' comprises a beam element 40, suspended above a respective cavity 41 formed through the frame 4', in a suitable position, for example at one of the corners of the same frame 4' (see also FIG. 6A).

The beam element 40 is anchored to the fixed structure 4 of the die 1' of the microelectromechanical device 100, in particular to the corresponding frame 4', through an anchoring portion 40a and carries at the top, above a cantilever portion 40b, a respective piezoelectric actuator 44, for example formed by superimposing: a bottom electrode region, of a suitable conductive material; a piezoelectric material region (for example made by a thin PZT film) arranged on the aforementioned bottom electrode region; and a top electrode region arranged on the piezoelectric material region.

The beam element 40 also has at the bottom, formed on the back of the die 1', a reinforcement portion 45, which is coupled, at a first end thereof, underneath the anchoring portion 40a, and is arranged, at a second end thereof longitudinally opposite to the first end, in proximity to the cantilever portion 40b of the same beam element 40.

In particular, the longitudinal extension of the aforementioned reinforcement portion 45 determines the corresponding extension of the cantilever portion 40b of the beam element 40.

During operation, biasing of the piezoelectric actuator 44 causes oscillation of the cantilever portion 40b of the beam element 40, in the vertical direction, at a given resonance frequency (the cantilever portion 40b being in this case the movable mass of the test structure 30').

In particular, the CD loss on the back of the die 1' may cause a variation of the longitudinal dimension of the reinforcement portion 45 and, consequently, of the cantilever portion 40b of the beam element 40, causing a variation of the resonance frequency.

Since there are no other variation factors that determine the resonance frequency in the test structure 30', the value of the same resonance frequency may be directly correlated to the dimensional variations on the back (due to the CD loss), thus providing an indication usable for the calibration of the sensitivity variations of the piezoresistive sensor 20 due to the same dimensional variations on the back.

Also in this case, the microelectromechanical device 100 may comprise a plurality of further test structures 30', to increase the calibration precision, for example by implementing suitable averaging operations based on the indications provided by the same test structures 30'. For example, in a manner not illustrated, four test structures 30' might be provided, arranged at the corners of the frame 4' of the microelectromechanical device 100.

Figure 8:
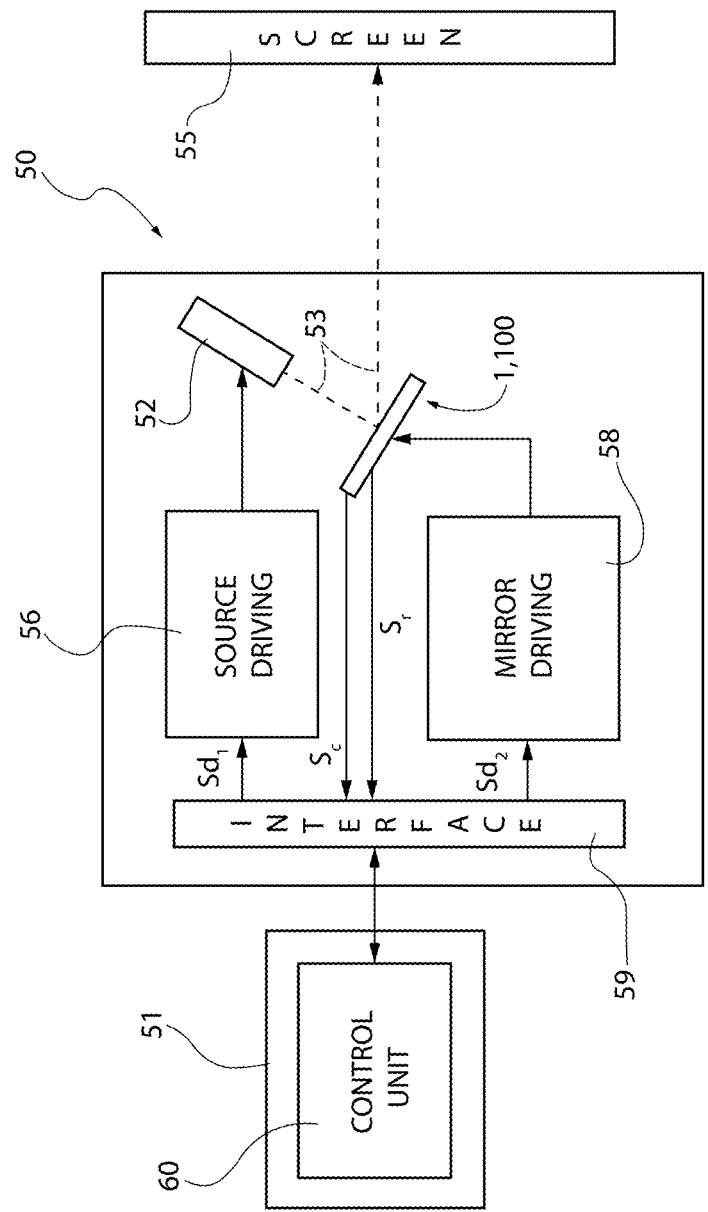
FIG. 8 is a schematic block diagram of an optoelectronic apparatus, for example a picoprojector, using the microelectronic mirror device.

As illustrated schematically in FIG. 8, the microelectromechanical device 1, 100 may be advantageously used in an optoelectronic device, such as a picoprojector, 50, for example to be functionally coupled to a portable electronic apparatus 51 (such as a smartphone or augmented reality glasses).

In detail, the optoelectronic device 50 comprises a light source 52, for example of a laser type, for generating a light beam 53; the microelectronic device 1, 100, acting as a mirror, for receiving the light beam 53 and for directing it towards a screen or display surface 55 (external and placed at a distance from the same pico-projector 50); a first driving circuit 56, for providing suitable command signals to the light source 52, for the generation of the light beam 53, according to an image to be projected; a second driving circuit 58, for providing suitable command signals to the actuation structure of the microelectronic device 1, 100 (and also, according to an aspect of this disclosure, to the test structure(s) 30, 30' which is/are integrated in the same microelectronic device 1, 100); and an interface 59, for receiving, from a control unit 60, in this case external, for example included in the portable apparatus 51, first control signals $S_{d1}$, for controlling the first driving circuit 56, and second control signals $S_{d2}$, for controlling the second driving circuit 58.

The control unit 60 also receives, through the interface 59, a feedback signal $S_r$, provided by the piezoresistive sensor 20 of the microelectromechanical device 1, 100, indicative of the position of the tiltable structure 2, so as to implement a feedback control of the operation of the same tiltable structure 2.

In particular, according to a possible implementation, the control unit 60 may also receive a calibration signal $S_c$, provided by the test structure 30, 30' integrated in the microelectromechanical device 1, 100, indicative of the sensitivity variation of the piezoresistive sensor 20, so as to actuate, based on this calibration signal $S_c$, a suitable self-calibration operation, for the correction of the position of the tiltable structure 2 determined according to the feedback signal $S_r$.

Alternatively, the calibration operation may be performed by electronics external to the portable apparatus 51 (again using the calibration signal $S_c$ provided by the test structure 30, 30' for the correction of the feedback signal $S_r$), in a calibration procedure which does not utilize the complex optical measurements used by known solutions.

The advantages of this disclosure are clear from the foregoing description.

In any case, it is again underlined that above disclosure allows avoiding the use of complex and expensive (in terms of money and time) calibration set-ups that utilize feedbacks of an optical nature, via cameras or the like.

In fact, the present disclosure provides a test structure integrated in the same microelectromechanical mirror device, which provides an indication about the possible sensitivity variation of the piezoresistive sensor, for the self-calibration of the detection signals provided as a feedback for controlling the mirror actuation.

It is highlighted that, thanks to the present disclosure, this self-calibration may also be performed in real time, that is during operation of the microelectromechanical mirror device, or in a dedicated calibration step, in any case requiring simple and effective calibration operations.

Furthermore, as discussed above, the particular arrangement of the piezoresistor elements of the piezoresistive sensor 20 is advantageous, allowing reduction the variations of detection sensitivity (and therefore facilitating the aforementioned self-calibration operations).

In general, the present disclosure allows exploitation of the advantages of the piezoelectric actuation (i.e., the use of reduced biasing voltages with a reduced energy consumption to obtain large displacements) and of the piezoresistive sensing of the mirror actuation, while having improved mechanical and electrical performance with respect to known solutions.

Finally, it is clear that modifications and variations may be made to what has been described and illustrated without thereby departing from the scope of this disclosure, as defined in the attached claims.

For example, this disclosure may also be applied in the case of a biaxial embodiment of the microelectromechanical mirror device (in a manner similar to what has been described in detail in the aforementioned United States Published Patent Application No. 2020/0192199, corresponding to European Patent Number EP3666727A1), that is in the case wherein the tiltable structure 2 is capable of performing rotation movements both around the first rotation axis (coinciding with the first median axis of symmetry X parallel to the first horizontal axis x), and around a second rotation axis (coinciding with the second median axis of symmetry Y parallel to the second horizontal axis y).

Furthermore, variations may generally be provided regarding the shape of the elements forming the microelectromechanical mirror device 1, 100 for example different shapes of the tiltable structure 2 (and of the corresponding reflecting surface 2'), or different shapes and/or arrangements of the driving arms 12a-12d.

Furthermore, the first and the second elastic suspension elements 6a, 6b might be, instead of a linear type, alternatively of a folded type.

The invention claimed is:

1. A microelectromechanical mirror device, comprising a die of semiconductor material including:
   a fixed structure defining a cavity;
   a tiltable structure carrying a reflecting region and elastically suspended above the cavity with a main extension in a horizontal plane;
   at least one first pair of driving arms coupled to the tiltable structure and carrying respective piezoelectric material regions that are configured to be biased to cause a rotation of the tiltable structure around a rotation axis that is parallel to a first horizontal axis of said horizontal plane;
   elastic suspension elements configured to elastically couple said tiltable structure to said fixed structure at said rotation axis, wherein the elastic suspension elements are stiff with respect to movement out of the horizontal plane and yielding with respect to torsion around said rotation axis;
   a piezoresistive sensor configured to provide a detection signal indicative of the rotation of the tiltable structure around the rotation axis; and
   at least one test structure integrated in said die and configured to provide a calibration signal indicative of a sensitivity variation of the piezoresistive sensor for calibration of said detection signal;
   wherein the sensitivity variation of the piezoresistive sensor is due to geometry variations in manufacturing of said microelectromechanical mirror device;
   wherein said at least one test structure comprises a movable mass operable in resonance by piezoelectric actuation, a resonance frequency associated with said at least one test structure having a variation which is a function of said geometry variations and correlated to said sensitivity variation of the piezoresistive sensor; and
   wherein said calibration signal is indicative of the variation of said resonance frequency.

2. The device according to claim 1, wherein said geometry variations are due to Critical Dimension loss in the manufacturing of said microelectromechanical mirror device, at a front and/or at a back of the die of semiconductor material.

3. The device according to claim 1, wherein said movable mass is arranged suspended inside the cavity; and wherein said at least one test structure further comprises:
   a supporting beam coupled at both ends to respective anchors integral with the fixed structure;
   a torsional elastic element which couples the movable mass to the supporting beam centrally with respect to said movable mass and to said supporting beam; and
   first and second piezoelectric actuators coupled to the supporting beam on opposite sides thereof with respect to the torsional elastic element.

4. The device according to claim 3, wherein said torsional elastic element has characteristics matching said elastic suspension elements in terms of length and width in said horizontal plane.

5. The device according to claim 4,
   further comprising elastic decoupling elements which couple said tiltable structure to said at least one first pair of driving arms on opposite sides and in proximity to the rotation axis and are stiff toward movements out of the horizontal plane and yielding to torsion around an axis parallel to said rotation axis; and
   wherein an empty area located in the horizontal plane between the supporting beam and the movable mass on sides of the torsional elastic element has dimensions corresponding to a respective empty area interposed in the horizontal plane between the elastic suspension elements and the elastic decoupling elements, laterally to the elastic suspension elements.

6. The device according to claim 2, wherein the variation of resonance frequency associated with said at least one test structure is due to a dimensional variation of said elastic suspension elements at the front of said die.

7. The device according to claim 2, wherein said movable mass of said at least one test structure is a beam element suspended above the cavity, anchored to the fixed structure and carrying at its top a respective piezoelectric actuator; wherein said beam element has at its bottom, at the back of said die, a reinforcement portion integral with said fixed structure and defining extension of a cantilever portion of the beam element.

8. The device according to claim 7, wherein the variation of the resonance frequency associated with said at least one test structure is associated with a dimensional variation of said reinforcement portion at the back of said die.

9. The device according to claim 1, wherein said calibration signal is a function of an impedance variation associated with said at least one test structure, said impedance variation having a determined and recognizable pattern at said resonance frequency.

10. The device according to claim 1, wherein said piezoresistive sensor comprises four piezoresistor elements connected in a Wheatstone bridge configuration according to an arrangement configured to reduce effects on detection sensitivity of said piezoresistive sensor caused by misalignments of the four piezoresistor elements with respect to said elastic suspension elements.

11. The device according to claim 10, wherein first and second of the four piezoresistor elements are arranged in proximity to a first of the elastic suspension elements on a first side of said tiltable structure along said rotation axis; and wherein third and fourth of the four piezoresistor elements are arranged in proximity to a second of the elastic suspension elements on a second side of said tiltable structure along said rotation axis opposite to said first side.

12. The device according to claim 11, wherein the first and second piezoresistor elements and third and fourth piezoresistor elements are arranged at a separation distance along a second horizontal axis orthogonal to the first horizontal axis and belonging to the horizontal plane such that they are located at zones with reduced variation of a stress distribution due to the torsion of said elastic suspension elements.

13. The device according to claim 1, wherein the piezoresistive sensor is arranged in proximity to, and is associated with, one of said elastic suspension elements to detect stress associated with its torsion and therefore with the movement of the tiltable structure.

14. The device according to claim 13, wherein said fixed structure forms, in the horizontal plane, a frame which delimits and surrounds said cavity and also has a first and a second supporting element extending longitudinally along said rotation axis inside the cavity from said frame on opposite sides of said tiltable structure; wherein said elastic suspension elements extend between said tiltable structure and a respective one of said first and second supporting elements; and wherein said piezoresistive sensor is formed at one of said first and second supporting elements.

15. The device according to claim 13,
wherein said fixed structure forms, in the horizontal plane, a frame which delimits and surrounds said cavity and also has first and second supporting elements extending longitudinally along said rotation axis inside the cavity from said tiltable structure on opposite sides of said tiltable structure;
wherein said elastic suspension elements extend between said frame and a respective one of said first and second supporting elements; and
wherein said piezoresistive sensor is formed at said frame.

16. An optoelectronic system, comprising:
the microelectromechanical mirror device of claim 1; and
a control unit, configured to feedback control operation of the microelectromechanical mirror device based on the detection signal indicative of the rotation of the tiltable structure around the rotation axis provided by the piezoresistive sensor, calibrated as a function of the calibration signal indicative of the sensitivity variation of the piezoresistive sensor provided by the at least one test structure.

17. A microelectromechanical mirror device, comprising:
a fixed structure defining a cavity;
a tiltable structure elastically suspended above the cavity and having a main extension in a horizontal plane;
a first pair of driving arms coupled to the tiltable structure and carrying respective piezoelectric material regions;
elastic suspension elements configured to elastically couple said tiltable structure to said fixed structure;
a piezoresistive sensor configured to provide a detection signal indicative of rotation of the tiltable structure; and
a test structure configured to provide a calibration signal indicative of a sensitivity variation of the piezoresistive sensor for calibration of said detection signal;
wherein said test structure comprises a movable mass operable in resonance by piezoelectric actuation, a resonance frequency associated with said test structure having a variation which is a function of geometry variations in the microelectromechanical mirror device and correlated to said sensitivity variation of the piezoresistive sensor; and
wherein said calibration signal is indicative of the variation of said resonance frequency.

18. The device according to claim 17, wherein said movable mass is arranged suspended inside the cavity; and wherein said test structure further comprises:
a supporting beam coupled at both ends to respective anchors integral with the fixed structure;
a torsional elastic element which couples the movable mass to the supporting beam centrally with respect to said movable mass and to said supporting beam; and
first and second piezoelectric actuators coupled to the supporting beam on opposite sides thereof with respect to the torsional elastic element.

19. The device according to claim 18, wherein said torsional elastic element has characteristics matching said elastic suspension elements in terms of length and width in said horizontal plane.

20. The device according to claim 19,
further comprising elastic decoupling elements which couple said tiltable structure to said first pair of driving arms on opposite sides and in proximity to a rotation axis of the tiltable structure and are stiff toward movements out of the horizontal plane and yielding to torsion around an axis parallel to the rotation axis of the tiltable structure; and
wherein an empty area located in the horizontal plane between the supporting beam and the movable mass on sides of the torsional elastic element has dimensions corresponding to a respective empty area interposed in the horizontal plane between the elastic suspension elements and the elastic decoupling elements laterally to the elastic suspension elements.

* * * * *